(12) United States Patent
Bergida et al.

(10) Patent No.: US 10,948,221 B1
(45) Date of Patent: Mar. 16, 2021

(54) SYSTEM FOR COOLING AN OBJECT OR A SPACE WITH AN ENDOTHERMIC SALT SOLUTION AND A DISTILLATION MEMBRANE

(71) Applicant: HECTO GROUP, LLC, Overland Park, KS (US)

(72) Inventors: John R. Bergida, Wildwood, MO (US); David D. Leavitt, Shawnee, KS (US); Johan Vanneste, Golden, CO (US); John Arthur Bush, Littleton, CO (US); Devlin Leavitt, Shawnee, KS (US)

(73) Assignee: HECTO GROUP, LLC, Overland Park, KS (US)

( * ) Notice: Subject to any disclaimer, the term of this patent is extended or adjusted under 35 U.S.C. 154(b) by 0 days.

(21) Appl. No.: 16/943,844

(22) Filed: Jul. 30, 2020

(51) Int. Cl.
| | | |
|---|---|---|
| *F25B 17/10* | (2006.01) | |
| *C09K 5/10* | (2006.01) | |
| *F25B 15/00* | (2006.01) | |
| *F25B 15/06* | (2006.01) | |

(52) U.S. Cl.
CPC ............. *F25B 17/10* (2013.01); *C09K 5/10* (2013.01); *F25B 15/002* (2013.01); *F25B 15/06* (2013.01); *F25B 2315/005* (2013.01)

(58) Field of Classification Search
CPC ........ F25B 15/002; F25B 15/06; F25B 17/02; F25B 17/10; F25B 2315/005
See application file for complete search history.

(56) References Cited

U.S. PATENT DOCUMENTS

| | | | | |
|---|---|---|---|---|
| 4,010,620 A | * | 3/1977 | Telkes ................. | F24F 3/1417 62/4 |
| 9,039,924 B2 | * | 5/2015 | Leavitt ................. | C09K 5/066 252/70 |

FOREIGN PATENT DOCUMENTS

| | | | | |
|---|---|---|---|---|
| DE | 2014-072068 | * | 5/2014 | ............. F01K 25/06 |
| FR | 721792 A | * | 3/1932 | ............. F25B 15/002 |

OTHER PUBLICATIONS

Grytan Effect of Iron Oxides Scaling on the MD Process Performance, Science Direct, Desalination 2016 (2007), pp. 88-102.

* cited by examiner

*Primary Examiner* — Christopher R Zerphey
(74) *Attorney, Agent, or Firm* — Lathrop GPM LLP

(57) ABSTRACT

A system for obtaining a desired cooling effect that utilizes a water-soluble endothermic salt solution and pure water. The cooling effect is created by cycling between two phases, a refrigeration phase and a dehydration phase. In the refrigeration phase, a water-soluble endothermic salt solution is used as a refrigerant to absorb heat by pumping through a first heat exchanger which cools an object or an area. In the dehydration phase, the cooling process is regenerated by pumping the now heated endothermic salt solution through a distillation membrane, where the solution and pure water are continuously commingled and separated from one another through a distillation membrane to optimize the thermodynamic efficiency of the system. At least two pumps provide the motive energy to move the endothermic salt and pure water through the closed loop piping system. The concentrated salt solution leaving the distillation membrane is further cooled using a second heat exchanger to facilitate crystal formation. Once crystal formation occurs, pure water is added back to the concentrated salt solution to restart the refrigeration phase, and thus, the cooling process.

18 Claims, 4 Drawing Sheets

SYSTEM FOR COOLING AN OBJECT OR A SPACE WITH AN ENDOTHERMIC SALT SOLUTION AND A DISTILLATION MEMBRANE

TECHNICAL FIELD

The system disclosed herein is directed to cooling an object or a space utilizing a circulating water-soluble endothermic salt and a distillation membrane.

BACKGROUND

A refrigerant is a substance or mixture, usually a fluid, used in a heat pump and refrigeration cycle. In most cycles it undergoes phase transitions from a liquid to a gas and back again. Many working fluids have been used for such purposes. Fluorocarbons, especially chlorofluorocarbons, became commonplace in the 20th century, but they are being phased out because of their ozone depletion effects. Other common or emerging refrigerants used in various applications are ammonia, carbon dioxide, sulfur dioxide, and non-halogenated hydrocarbons such as propane.

The ideal working fluid would have favorable thermodynamic properties, be noncorrosive to mechanical components, and be safe, including freedom from toxicity and flammability. It would not cause ozone depletion or climate change. Since different fluids have the desired traits to different degrees, trade-offs are necessary when choosing a fluid.

There exist hundreds of thousands of refrigerating systems across the United States and millions worldwide. The most utilized of these is the vapor compression system, which relies upon four phases of action performed upon a refrigerant to produce a desired cooling effect. The first phase consists of work performed by a compressor wherein a refrigerant vapor is compressed from low to high pressure. Next, a condenser is used to discharge heat to the surroundings by changing the refrigerant from a high-pressure vapor to a high-pressure liquid. This liquid then enters an expansion valve which changes the liquid to a low-pressure vapor-liquid mixture. Finally, this mixture enters an evaporator, which removes heat from the environment by changing the refrigerant vapor-liquid mixture to a low-pressure vapor, which is then sent back to the compressor.

Examples of common refrigerants in the United States include 404A HFC as a refrigerant in deep freezers, R-507 HFC for use in freezers, R-134a HFC for use in automobile air conditioning systems, and R-22 HFC for most every other cooling device. These refrigerants are costly and, as noted above, each have their own impact upon the environment.

An alternative refrigerant utilizes water-soluble salts that absorb heat from the environment when they are dissolved in water. Such water-soluble salts when mixed together with a water solvent form a solution that can be used as a working fluid for refrigeration. The dissolution of such salts in water creates an endothermic process which is capable of absorbing heat from the surrounding environment, resulting in a solution that is colder than the salt or the water. Not all salts that are added to water result in an endothermic process. Some salts evolve heat during dissolution by an exothermic process and other salts barely absorb or evolve any heat upon dissolution.

Salts are typically ionic compounds, made of positive ions (cations) and negative ions (anions). The process of dissolving a salt in water, called solvation or hydration, involves three main steps: breaking the attractions between the individual salt molecules within their crystalline lattice to form salt ions; breaking the attractions between the individual water molecules in the solvent; and spontaneous mixing of the salt ions with the water molecules to form a salt solution.

Separating the crystalline salt into its constituent ions is always endothermic because energy is required to overcome the forces that hold the crystalline salt together. Separating the water molecules from each other to make room for the salt ions is also endothermic because energy is required to overcome the intermolecular forces among the water molecules. Mixing the salt with the water is exothermic because energy is released as the salt ions interact through intermolecular forces with the water molecules during the process of hydration. The water that is mixed with a hydroscopic endothermic salt to induce the salt to dissolve into a solution is commonly called the water of hydration.

If it takes more energy to separate the crystalline salt into its constituent ions than is released when the water molecules hydrate the ions, then the temperature goes down and the process is endothermic. If it takes less energy to separate the crystalline salt into its constituent ions than is released when the water molecules hydrate the ions, the temperature goes up and the reaction is exothermic. The measure of this energy, or heat content, is referred to as enthalpy. As a salt dissolves in a solvent, the "heat of solution"—the change in enthalpy—can be measured as a change in the temperature of the solution. If the process of dissolving absorbs heat, the temperature of the solution decreases and the heat of solution is positive and the process is described as endothermic.

According to Hess's law, the overall enthalpy change upon solution formation, called the enthalpy of solution, is the sum of the changes in enthalpy for each step:

$\Delta H soln = \Delta H solute + \Delta H solvent + \Delta H mix$
endothermic (+) endothermic (+) exothermic (−)

If the sum of the endothermic terms is greater in magnitude than the exothermic term, then the $\Delta H soln$ is positive and the solution process is endothermic. Here a positive heat of solution and the tendency toward greater entropy will drive the formation of a solution as long as the endothermic salt is soluble in the solvent.

Endothermic salts vary significantly in enthalpy and solubility depending upon their composition. An optimum endothermic salt for a refrigeration process will comprise a substance that has a positive heat of solution and is very soluble in water and whose solubility in water increases with the temperature of the solution. For example, U.S. Pat. No. 9,039,924 discloses that when a dry endothermic salt having a solubility of around 150 gm/100 ml of water at a temperature of around 20° C., a solubility of around 410 gm/100 ml water at a temperature of around 60° C. and a heat of solution greater than 25 KJ/mol is dissolved in 100 ml of water having a temperature of 20° C., the temperature of the resulting endothermic salt solution can decrease from around 20° C. to less than −7° C. in less than 15 seconds.

Upon hydration, an endothermic salt solution that has attained a temperature much colder than the surrounding environment can be used to cool beverages, foodstuffs and other materials up until the temperature of the endothermic salt solution reaches thermal equilibrium with the environment. At that point, the solution has no more beneficial effect as a coolant unless it can be regenerated by dehydration. A critical property of an endothermic salt for a refrigeration process is its capability to be regenerated by dehydration using a rapid and energy-efficient method of dehydration.

Salt solutions are typically regenerated by dehydration using thermal processes such as conventional drying, evaporation in dry air, or mechanical vapor compression processes. Such processes that are designed to quickly dehydrate salts utilize expensive and complicated process equipment to heat the salt solutions to their boiling point to flash off the water of hydration and generate the dry crystalline salts. Processes that utilize dry air evaporation where the dry air is in direct contact with the water to be evaporated require extensive contact time between the dry air and the salt solutions and often entrain salt particles in the dry air.

Endothermic salt solutions can also be dewatered or dehydrated by membrane filtration. Pressurized membrane filtration processes such as reverse osmosis (RO), microfiltration (MF), ultrafiltration (UF) and nanofiltration (NF) are commonly used to desalinate dilute salt solutions and other brackish waters containing less than 5% salt. These pressurized membrane systems apply high pressure to the salt solution in contact with the feed side of a membrane to induce liquid water to permeate through very small pores within the membrane material. Since the hydrated diameter of a liquid water molecule is typically much smaller than the hydrated diameter of the other ions in the salt solution, the membrane pores are designed to be large enough to allow the liquid water molecules to permeate but too small to allow the other ions to readily pass through.

One of the more effective membrane dehydration processes is RO but studies have shown that water recovery by RO is hydraulically limited. RO desalination of salt solutions such as seawater containing around 3% salt typically operates at pressures above 1,000 psi to achieve 60 percent water recovery, and RO treatment of brackish water containing less than 1% salt is limited to approximately 80 percent water recovery by mineral scale formation. Other pressure-driven membrane separation processes such as MF, UF and NF have some value in removing scale-forming calcium and magnesium minerals but are not selective for removing monovalent salts from salt solutions.

Pressurized membrane filtration systems are thus subject to many limitations when used to dewater concentrated salt solutions containing more than 5% salt. The high pressure used to drive the liquid water through the pores also drives small particles and larger ions into the permeable surfaces of the membrane, blocking the pores and building up a boundary layer on the feed side of the membrane that is resistant to the permeation of liquid water. The rate at which water permeates from the salt solution through the membrane is called the flux and is measured as the volume of water that permeates through the membrane per unit area of the membrane per unit time, typically expressed as the liters of water permeated per square meter of membrane per hour (LMH). As the boundary layer forms, the flux decreases because of concentration polarization across the membrane and the flow of liquid water through the membrane eventually is terminated. All pressurized membrane technologies are susceptible to concentration polarization and fouling when used to treat highly concentrated salt solutions and show significant reduction in flux over time.

Low pressure membrane separation processes such as forward osmosis (FO) appear to have advantages over more traditional pressurized membrane separation technologies when used to treat concentrated salt solutions. In the FO process, a semipermeable membrane is used to permeate liquid water from a salt solution into a more highly concentrated draw solution having a higher osmotic pressure compared to the salt solution. The difference in osmotic pressure across the membrane drives the diffusion of water through the membrane from the lower osmotic pressure feed to the higher osmotic-pressure draw solution and there is no need to apply additional hydraulic pressure to the feed side of the membrane as is the case for MF, UF, NF and RO. The water that permeates through the membrane into the draw solution dilutes the concentration of the draw solution, which must then be re-concentrated for reuse by another suitable process.

During FO diffusion, the salt ions in the salt solution feed stream are rejected by the membrane while the water passes through the membrane, resulting in a very concentrated salt solution. The FO process thus significantly reduces the volume of the feed stream without thermal treatment or the application of external pressure to the membrane. Because FO separation occurs at ambient pressure, less energy is required to transport water across the membrane and significantly less fouling of the membrane occurs compared to pressurized membrane processes. FO will only occur when the osmotic pressure of the salt solution feed stream is less than the osmotic pressure of the draw solution.

Because highly concentrated salt solutions often exhibit very high osmotic potential, it is a difficult task to develop draw solutions whose osmotic potential is sufficiently high to draw water from the highly concentrated salt solution feedstock. Such draw solution candidates must also be able to readily release the water through regeneration. The regeneration of the draw solution requires additional processing which consumes energy. FO is typically coupled with another process step to extract clean water from the draw solution to regenerate the concentrated draw solution. This additional process step can be a thermal process such as evaporation and distillation, pressurized membrane processes such as UF, NF or RO or a hybrid thermo-membrane process such as membrane distillation (MD). The success of FO desalination depends upon how easily and efficiently the draw solute can be separated from the water.

Membrane distillation (MD) can be effectively used to permeate water from highly concentrated salt solutions without using FO when there is sufficient temperature difference between the highly concentrated salt solution feed and the distillate to drive the permeation. MD is a low temperature, low pressure membrane-assisted distillation processes that permeates water vapor through a hydrophobic membrane in response to a driving force created by the temperature difference between the feed and distillate. MD is not limited by the osmotic pressure of the concentrated salt solution feed and does not require a high osmotic pressure draw solution.

MD uses a hydrophobic membrane and a heat source to generate a temperature difference between the salt solution feed on the higher temperature side of the membrane and the fresh-water product or distillate on the low temperature side. The temperature difference results in a vapor pressure differential across the membrane which is the driving force for water vapor flux through the pores of the membrane such that only water vapor passes through the membrane.

There are at least four types of membrane distillation configurations. The first of these is direct contact membrane distillation (DCMD) wherein both the feed stream and the permeate stream are in direct contact with the membrane surfaces. DCMD has these important attributes: (a) the permeation of water vapor occurs at the feed—membrane surface; (b) the vapor movement is caused by the vapor pressure difference across the membrane induced by the temperature difference between the feed and the permeate; (c) the permeate is condensed inside the membrane module; (d) the ions in the feed should not significantly penetrate in the membrane due to the hydrophobic nature of the membrane; and (e) operation occurs well below liquid entry pressure level of the membrane. The advantages of the DCMD membranes are that they have (a) a high permeate flux, (b) are simple in design and operation and (c) internal heat recovery is available. The disadvantages of the DCMD is (a) their low thermal efficiency, (b) high impact of temperature and concentration polarization, (c) chance of contamination in the permeate is high, and (d) heat loss by conduction.

The second configuration is air gap membrane distillation (AGMD). With this configuration, the feed solution is in direct contact with the hot, feed side of the membrane surface and an air gap is introduced between the permeate side of membrane surface and a condensation surface. The advantages of the AGMD are (a) low heat loss due to poor conduction of heat by the air, (b) high thermal efficiency and (c) the possibility of internal heat recovery. The disadvantages are (a) lower permeate flux, (b) the need for a larger footprint to accommodate the condenser and (c) an increased resistance to mass transfer across the membrane.

The third configuration is the sweeping gas membrane distillation (SGMD). With this configuration, inert gas is used to sweep the vapor at the permeate side of the membrane to condense outside of the membrane module, creating a gas barrier to reduce heat loss in the system. The advantages of this membrane are (a) high mass transfer rate, (b) low heat loss by conduction and (c) an ability to remove volatile compounds from the aqueous solution. The disadvantages of this membrane are (a) that heat recovery is difficult, (b) dealing with sweeping gas is intricate, and (c) small volumes of permeate can diffuse in a large sweep gas volume which requires a larger condenser.

The fourth membrane configuration is vacuum membrane distillation (VMD). With this membrane a pump is used to generate a vacuum in the permeate side of the membrane to decrease vapor pressure and increase the driving force. This membrane configuration is widely used for water purification as it is an attractive and cost-competitive membrane separation technology. This membrane configuration is useful for removing volatile compounds from aqueous solutions.

Advantages of the VIVID are: (a) high permeate flux; (b) less conductive heat loss; (c) reduced thermal and concentration boundary layers on the permeate side of the membrane; (d) more water gets evaporated from solution and is released from membrane as permeate; (e) vacuum conditions make the permeate flow much easier, leading to a higher flux; high driving force to facilitate a greater permeate flux compared to other configurations; and (f) (g) negligible conductive heat loss because of the low pressure on the permeate side of the membrane. Several disadvantages of the VIVID configuration are (a) problematic membrane pore wetting and flooding, (b) difficulty in recovering heat and (c) condensation takes place outside the membrane module, requiring an external condenser.

Additionally, there are multiple membrane types available. A listing of exemplary membrane types includes: (1) single hydrophobic layer membranes; (2) bi-layered hydrophobic/hydrophilic membranes; (3) hollow fiber single hydrophobic layer; and (4) bi-layered hydrophobic/hydrophilic membranes. Membranes are typically constructed from polytetrafluoroethylene (PTFE), polypropylene (PP), polyethylene (PE) and polyvinylidene fluoride (PVDF).

Membranes are typically enclosed within a module. The modules are designed to optimize the available surface of the membrane material for separation according to the application. Typical modules can be flat plate, hollow-fiber, spiral wound, or tubular in their configuration. Other suitable hollow fiber hydrophobic membranes are made from polypropylene and polyethylene. Graphene and graphene-oxide membranes have also shown considerable promise in salt solution desalination. Perforene™ for example, contains holes as small as one nanometer in diameter and the membrane is capable of trapping sodium, chlorine and other ions, while allowing water molecules to readily pass through. Other membrane compositions that are similar to graphene such as covalent organic framework membranes (COF), metal organic framework membranes (MOF) and Porphryn polymerized membranes (PPM) also show considerable promise.

An important consideration in the design and operation of membrane distillation system is that an increase in feed temperature significantly increases the membrane flux. In other words, the vapor pressure of the feed solution increases with the increase in temperature which in turn increases the driving force across the membrane surface. In addition, an increase in the temperature gradient positively affects the diffusion coefficient, leading to an increase in vapor flux. It has also been determined that increasing the volumetric flow rate will enhance permeate flux and reduce temperature polarization due to the decrease in the thermal boundary layer thickness that reduces the convective heat transfer coefficient.

Factors that affect membrane distillation include fouling which reduces the membrane area for water vaporization due to membrane pore clogging which in turn reduces the flux. The degree of fouling depends on the size of the foulant and the pore size of the membrane. Contamination deposition on the membrane accelerates wetting of the membrane whereby water enters the larger pores of the membrane by breaking the surface tension of the interface between liquid and vapor on the membrane surface. Fouling can be caused by feed water characteristics, membrane properties, operating conditions and foulant characteristics that facilitate the interaction between the membrane surface and the organic, inorganic and microbial constituents present in the liquid stream.

Fouling typically occurs when contaminants within a fluid to be purified or separated out from the feed stream precipitate on top of the membrane. Fouling also occurs when microorganisms present in the feed stream colonize the membrane surface, producing a biofilm. One form of fouling called scaling occurs when elements within the feed stream such as calcium, magnesium, silica and barium form precipitates on the membrane as the concentration of the feed stream increases during membrane distillation. Fouling is less of a problem when dealing with feed streams that do not contain contaminants and are comprised of pure chemical solutions, such as is the case with concentrated salt solutions of a known chemical composition and purity.

Although fouling from contaminants is minimized when processing pure salt solutions, premature crystal formation on the membrane surface during MD is a factor that can affect membrane durability and performance. Highly concentrated salt solutions and supersaturated salt solutions may form thick layers of deposited crystals on the surface of membranes that can greatly reduce flux and damage membrane pore structure under non-optimum processing conditions. Mixtures of salt solution and precipitated crystals also form crystallate slurries that can be difficult to pump without damaging pump impellers and seals. Whether such crystal deposition impedes performance and longevity of membranes, pumps and piping is found to be dependent upon the morphology of the crystals.

The dehydration of concentrated salt solutions to the point where crystallization of the salts can occur in the concentrated salt solution with minimal loss of the driving force is a significant advantage of the MD process with respect to refrigeration. Dehydration at very low hydraulic pressures of less than 1 bar and the possibility to utilize low-grade waste heat from renewable and/or industrial sources to heat the salt solution feedstock are other positive attributes of MD. High water fluxes greater than 20 LMH can be achieved with temperature differences less than 30° C. across the membrane. MD thus appears to have great potential as an integral part of an endothermic salt refrigeration process.

The use of waste heat to dehydrate concentrated salt solutions represents a valuable advantage of MD for refrigeration and cooling. According to U.S. Department of Energy, up to 50% of industrial energy input in the US is released as low-grade waste heat. Recapturing this waste heat can be difficult due to the limit set by the Carnot efficiency, which at a temperature of 60° C. is only 14.6%. For comparison, the electrical energy required for typical RO plants employed for the desalination of seawater that are equipped with energy recovery devices range from 4 to 6 kWh per cubic meter of seawater processed by the plant. The Scarab MD system for the same process has an electrical energy consumption as low as 0.6 kWh per cubic meter, which is almost ten times lower than the RO process. For example, thermally driven cooling systems using waste heat, such as adsorption chiller, have been shown to lower electrical energy demand.

Using waste heat for refrigeration and chilling also reduces the demand for both electrical generation and fresh water. For example, the total water usage for thermoelectric power for 2015 was 133,000 Mgal/day, nearly 100 percent of which was withdrawn from surface-water sources which were predominantly freshwater. Total water usage for thermoelectric power accounted for 41 percent of total water usage, 34 percent of total freshwater usage, and 48 percent of fresh surface-water for all uses. Thus thermo-electric generation uses over 47% of water withdrawn in the US—more than agricultural and industrial water use combined.

The majority of water used in thermo-electric power plants is for cooling. Withdrawing water for cooling requires electricity and wastes a most valuable natural resource—fresh water. Even though the thermal energy required for MD is higher than RO, the cost for this energy input is comparatively small compared to electrical energy when waste heat is the source. By using the heat added to the salt solution during cooling to increase the efficiency of the distillation membrane, waste heat is utilized while enhancing dehydration of the concentrated salt solution.

SUMMARY

It is a primary object of the system disclosed herein to provide a refrigeration system that utilizes a water-soluble endothermic salt. The system disclosed herein utilizes a first reservoir containing a water-soluble endothermic salt solution at temperature $T1$ separated from a second reservoir containing pure water at a temperature $T2$, the first and second reservoirs separated by a distillation membrane. The system comprises two closed loop process streams, the first one that contains the water-soluble endothermic salt solution in circulation throughout the first reservoir and the second one that contains the pure water in circulation throughout the second reservoir. The cooling process consists of two main phases of operation, a refrigeration phase and a dehydration phase.

During the refrigeration phase, the first process loop containing a water-soluble endothermic salt solution passes through a refrigeration unit between the reservoir and the distillation membrane. This refrigeration unit absorbs heat from a heat source to cool an area. After passing through the refrigeration unit and absorbing heat, the salt solution recirculates back to the first reservoir. During this phase, the valve leading to the distillation membrane is closed, and the second loop process containing pure water is not operating. The second loop process containing the pure water will only operate during the dehydration phase. This phase continues until the heat source in the refrigeration unit comes into thermal equilibrium with the temperature $T1$ of the first reservoir. Once this occurs, the dehydration phase begins.

The dehydration phase starts by bypassing the refrigeration unit by closing the valves on either side of the refrigeration unit. A third valve is then opened to redirect flow around the refrigeration unit and on to the distillation membrane. The second process loop containing pure water will be pumped to the distillation membrane when the bypass of the refrigeration unit is complete. The first process loop containing the salt solution may pass through an optional heater before reaching the distillation membrane.

This heater will only prove necessary in certain applications where a greater flux is needed, which is driven by a greater temperature difference across the distillation membrane and thus a higher salt solution feed temperature, $T4$. The two process loops intersect with each other within the module that contains the distillation membrane, with the flow of the salt solution in direct contact with the feed side of the membrane and the flow of the pure water in either direct or indirect contact with the permeate side of the membrane whereby each process flow stream flows countercurrent to the other.

The temperature $T4$ of the water-soluble endothermic salt solution on the feed side of the distillation membrane is greater than the temperature $T2$ of the pure water on the permeate side of the membrane, with both fluids in contact with the distillation membrane inside of the module that contains the membrane. The temperature difference or temperature gradient between the two fluids in contact with the distillation membrane creates a driving force that induces water vapor to pass from or permeate from the water-soluble endothermic salt solution in the first reservoir through the distillation membrane into the pure water circulating throughout the second reservoir.

Here the flux at which water vapor permeates from the endothermic salt solution in the first reservoir through the distillation membrane into the pure water in the second reservoir is measured as the volume of water vapor that permeates through the distillation membrane per unit area of the membrane per unit time. With sufficient contact time between the two fluids and the distillation membrane, essentially all of the water of hydration will permeate from the endothermic salt solution in the first reservoir, causing the concentration of the endothermic salt in the endothermic salt solution to increase until the saturation point is exceeded and the salt is induced to crystallize.

The contact time can be optimized to achieve a desired result. If the desired result is to remove all or most all the water of hydration to produce a semi-solid mass of endothermic salt crystals, the contact time is maximized to achieve that result. If the desired result is to remove greater than 50% of the water of hydration to achieve a slurry of endothermic salt crystals suspended in a supersaturated salt solution that is still fluid and able to be pumped through the conduits of a refrigeration system, the contact time can be optimized for that purpose.

The morphology of the crystals can also be optimized to enhance the processability of the salt solutions that contain crystals. During MDC, crystallization was induced to occur rapidly once the feed solution cooled to the point where it became supersaturated, forming needlelike crystals which were generally 1 mm in width or more and often several centimeters in length that tended to grow along flow channels and in line with channel spacer filaments. This needlelike crystal morphology was the reason that the crystallization had little effect on membrane performance, as the crystals were far too large to penetrate the membrane pores and grow inside the membrane, which can damage the membrane structure and lead to pore wetting. Here the crystal morphology differs significantly in shape and size from the crystals that form when a solution of ammonium nitrate is evaporated in dry air. Air-dried crystal morphology is characterized by agglomerations of very small crystals that could potentially damage the membrane and plug the pores, leading to reduced flux and shortened membrane life.

The temperature of the endothermic salt solution can also be optimized to achieve a desired result. FIG. 1 illustrates the increase in solubility with an increase in temperature for a highly soluble endothermic salt. As the solubility of the endothermic salt increases with temperature, the weight percent of salt in the salt solution also increases with the temperature of the solution. Since the weight percent of the salt in the salt solution is directly related to the cooling capacity of the salt solution, this property of the salt lends itself to increased cooling capacity at the higher temperatures where the salt solution contacts the distillation membrane and enhanced crystallization in the dehydrated concentrated salt solution that flows out of the membrane module.

As an example, a typical small commercial refrigerator having an operating cooling capacity of 500 watts requires around 2,050 Btu/hr heat removal to maintain an average temperature of 7° C. For the endothermic salt shown in the solubility—temperature curve having a ΔHsoln of around 25 KJ/mol, around 45 kg of endothermic salt dissolved in water is required to attain 2,050 Btu/hr heat removal. The amount of water necessary to dissolve this amount of salt depends upon the temperature of the solution. As shown in FIG. 2, almost 40 kg of water is required to dissolve the salt at −5° C. while only around 10 kg of water is required to dissolve the salt at 60° C. A 60° C. saturated salt solution contains 80% salt by weight while a −5° C. salt solution only contains 52% salt by weight.

Since the resulting salt solution will lose its cooling capacity after one hour and must be dehydrated to regain its cooling capacity, the amount of water added to hydrate the salt affects the processing time and energy required to dehydrate the salt. Lowering the temperature of a 60° C. saturated salt solution will induce crystals to form in the solution without any additional processing step that when rehydrated would remove heat from the surrounding environment. The endothermic salt refrigeration system disclosed herein optimizes the temperatures of the solute and solvent and the concentration of the solute to maximize the performance of the system.

The decrease in the temperature of the resulting endothermic salt solution is dependent upon the pre-dissolution temperature of the endothermic salts and the water of hydration and the composition of the endothermic salt. Endothermic salts vary significantly in enthalpy and solubility depending upon their composition. An optimum endothermic salt for a refrigeration process will comprise a substance that has a positive heat of solution and is very soluble in water and whose solubility in water increases with the temperature of the solution The decrease in the temperature of the resulting endothermic salt solution is also dependent upon the concentration of endothermic salt crystals in the endothermic salt solution. Although a mass of dry or essentially dry endothermic salt will attain the greatest temperature drop upon dissolution in water, a slurry of endothermic salt crystals suspended in a supersaturated salt solution that is still fluid and able to be pumped will also decrease in temperature when water of hydration is added back to the endothermic salt slurry to induce the salt crystals in the slurry to dissolve in the water. The extent of the temperature drop will depend upon the concentration of salt crystals suspended in the slurry when the water of hydration is added to the slurry. The water of hydration is pumped from the second reservoir using the permeate pump back to the first reservoir. Once the water of hydration is added back to the first reservoir, the dehydration phase is complete, and the refrigeration phase can be continued.

As stated herein, it is an object of the system disclosed herein to provide a chemical refrigeration system which can achieve large drops in liquid temperatures not limited by the solubility limitations of a selected chemical dissolved in a liquid.

It is also an object of the system disclosed herein to provide a chemical refrigeration system which will operate successfully with only a minimal amount of external energy being applied thereto.

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

DETAILED DESCRIPTION

Figure 1:
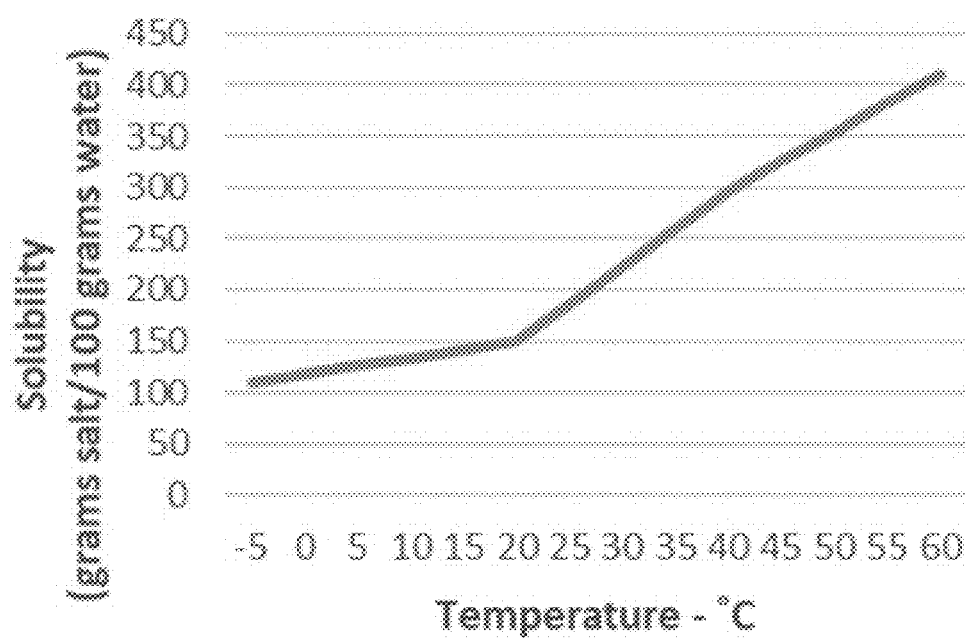
FIG. 1 illustrates the increase in solubility with an increase in temperature for a highly soluble endothermic salt.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

The system disclosed herein is directed to a unit capable of cooling a substance, an object or a space, such as a room, to a desired temperature and to accomplish the cooling process in a manner that is highly energy efficient. The system is comprised of a pure water reservoir preferably containing highly pure distilled water and a salt solution reservoir containing endothermic salt solutions.

The endothermic salt solution, is preferably comprised of various salts and water. A review of the prior art reveals that, although a wide variety of chemical compositions have been disclosed, only a select few are preferred based upon performance as a cooling agent. This is best illustrated by a review of the selected endothermic compounds shown below in Table 1.

TABLE 1

Selected Endothermic Compounds Useful For Cooling Surfaces, Solids and Liquids

| Solute | MW (gm/mol) | $LD_{50}$ (oral-rat; mg/kg) | Heat of Solution (kJ/mol) | Solubility (gm solute per 100 gm water at 20° C.) | Heat Absorbed (during dissolution of compound in 100 gm of water at 25° C. in kJ) | Theoretical Change in Temperature of a saturated solution (° C.) | Predicted Change in Temperature of a saturated solution exhibiting 30% heat loss (° C.) | Predicted Final Temperature of 255 gm of liquid exposed to saturated solution exhibiting 50% heat loss (° C.) |
|---|---|---|---|---|---|---|---|---|
| $C_{12}H_{22}O_{11}$ | 342.3 | 29700 | 5.4 | 201.9 | 3.19 | 3 | 2 | 24 |
| $C_6H_{12}O_6$ | 180.16 | 25800 | 11 | 49 | 2.99 | 5 | 3 | 24 |
| $C_6H_{12}O_6 \cdot H_2O$ | 198.16 | 25800 | 19 | 49 | 4.70 | 8 | 5 | 23 |
| $CO(NH_2)_2$ | 60.07 | 8471 | 15 | 108 | 26.97 | 31 | 22 | 16 |
| $KF \cdot 2(H_2O)$ | 94.13 | 245 | 6.97 | 349 | 25.84 | 14 | 10 | 17 |
| KCl | 74.55 | 2600 | 17.22 | 34.2 | 7.90 | 14 | 10 | 22 |
| $KClO_3$ | 122.55 | 1870 | 41.38 | 7.3 | 2.46 | 5 | 4 | 24 |
| $KClO_4$ | 138.54 | 100 | 51.04 | 1.5 | 0.55 | 1 | 1 | 25 |
| KBr | 119 | 3070 | 19.87 | 65.3 | 10.90 | 16 | 11 | 21 |
| $KBrO_3$ | 106 | 321 | 41.13 | 6.91 | 2.68 | 6 | 4 | 24 |
| KI | 166 | 1862 | 20.33 | 140 | 17.15 | 17 | 12 | 19 |
| $KIO_3$ | 214 | 136 | 27.74 | 4.74 | 0.61 | 1 | 1 | 25 |
| $KNO_2$ | 85.11 | 250 | 13.35 | 306 | 48.00 | 28 | 20 | 17 |
| $KNO_3$ | 101.1 | 3750 | 34.89 | 31.6 | 10.91 | 20 | 14 | 21 |
| $K_2S_2O_3 \cdot 5H_2O$ | 360.32 | 802 | 47 | 205 | 26.74 | 21 | 15 | 16 |
| KCN | 65.12 | 5 | 11.72 | 71.6 | 12.89 | 18 | 13 | 21 |
| KCNO | 81.12 | 841 | 20.25 | 75 | 18.72 | 26 | 18 | 19 |
| KCNS | 97.18 | 854 | 24.23 | 224 | 55.85 | 41 | 29 | 7 |
| $KMnO_4$ | 158.04 | 1090 | 43.56 | 6.3 | 1.74 | 4 | 3 | 24 |
| $K_2SO_4$ | 174.25 | 6600 | 23.8 | 11.1 | 1.52 | 3 | 2 | 25 |
| NaF | 41.99 | 52 | 0.91 | 4.13 | 0.09 | 0 | 0 | 25 |
| NaCl | 58.44 | 3000 | 3.88 | 359 | 23.84 | 12 | 9 | 17 |
| $NaClO_2$ | 90.44 | 165 | 0.33 | 39 | 0.14 | 0 | 0 | 25 |
| $NaClO_2 \cdot 3H_2O$ | 144.44 | 165 | 28.58 | 39 | 7.72 | 13 | 9 | 22 |
| $NaClO_3$ | 106.44 | 1200 | 21.72 | 101 | 20.61 | 25 | 17 | 18 |
| $NaClO_4$ | 122.44 | 2100 | 13.88 | 201 | 22.79 | 18 | 13 | 18 |
| $NaClO_2 \cdot H_2O$ | 140.44 | 2100 | 22.51 | 201 | 32.22 | 26 | 18 | 14 |
| $NaBr \cdot 2H_2O$ | 138.89 | 3500 | 18.64 | 90.5 | 12.15 | 15 | 11 | 21 |
| $NaBrO_3$ | 150.89 | 301 | 26.9 | 37.4 | 6.67 | 12 | 8 | 23 |
| $NaI \cdot 2H_2O$ | 185.89 | 4340 | 16.13 | 184 | 15.97 | 13 | 9 | 20 |
| $NaIO_3$ | 197.89 | 180 | 20.29 | 9.47 | 0.97 | 2 | 1 | 25 |
| $NaNO_2$ | 68 | 180 | 13.89 | 80.8 | 16.50 | 22 | 15 | 20 |
| $NaNO_3$ | 84.99 | 3236 | 20.5 | 87.6 | 21.13 | 27 | 19 | 18 |
| $NaC_2H_3O_2 \cdot 3H_2O$ | 136.08 | 3530 | 19.66 | 85 | 12.28 | 16 | 11 | 21 |
| $Na_2S_2O_3 \cdot 5H_2O$ | 248.17 | 2300 | 47.4 | 79 | 15.09 | 20 | 14 | 20 |
| NaCN | 49 | 6 | 1.21 | 58 | 1.43 | 2 | 2 | 25 |
| $NaCN \cdot 2H_2O$ | 85 | 6 | 18.58 | 82 | 17.92 | 24 | 16 | 19 |
| NaCNO | 65.01 | 5 | 19.2 | 110 | 32.49 | 37 | 26 | 14 |
| NaCNS | 81.05 | 764 | 6.83 | 139 | 11.71 | 12 | 8 | 21 |
| $Na_3PO_4$ | 163.94 | 7400 | 15.9 | 8.8 | 0.85 | 2 | 1 | 25 |
| $NaHCO_3$ | 83.99 | 4220 | 16.7 | 7.8 | 1.55 | 3 | 2 | 24 |
| $NH_4Cl$ | 53.49 | 1650 | 14.78 | 29.7 | 8.21 | 15 | 11 | 22 |
| $NH_4ClO_4$ | 117.49 | 100 | 33.47 | 20.8 | 5.93 | 12 | 8 | 23 |
| $NH_4Br$ | 97.94 | 2700 | 16.78 | 78.3 | 13.42 | 18 | 13 | 21 |
| $NH_4I$ | 144.94 | 76 | 13.72 | 172 | 16.28 | 14 | 10 | 20 |
| $NH_4IO_3$ | 192.94 | 500 | 31.8 | 182 | 30.00 | 25 | 18 | 15 |
| $NH_4NO_2$ | 64.04 | 57 | 19.25 | 150 | 45.09 | 43 | 30 | 10 |
| $NH_4NO_3$ | 80.06 | 2217 | 25.69 | 150 | 48.13 | 46 | 32 | 9 |
| $NH_4CN$ | 44.06 | 525 | 17.57 | 60 | 23.93 | 36 | 25 | 17 |
| $NH_4CNS$ | 76.12 | 954 | 22.58 | 144 | 42.72 | 42 | 29 | 11 |
| $(NH_4)_3PO_4$ | 149 | 3000 | 14.45 | 37.7 | 3.66 | 6 | 4 | 24 |
| $CH_3NH_3Cl$ | 67.52 | 1600 | 5.77 | 30.6 | 2.61 | 5 | 3 | 24 |
| $AgClO_4$ | 207.32 | Toxic | 7.38 | 557 | 19.83 | 7 | 5 | 18 |
| $AgNO_2$ | 153.87 | Toxic | 36.94 | 4.2 | 1.01 | 2 | 2 | 25 |
| $AgNO_3$ | 169.87 | Toxic | 22.59 | 257 | 34.18 | 23 | 16 | 14 |
| $RbClO_4$ | 184.92 | 3310 | 56.74 | 1.3 | 0.40 | 1 | 1 | 25 |
| $RbNO_3$ | 147.47 | 4625 | 36.48 | 44.28 | 10.95 | 18 | 13 | 21 |
| $CsClO_4$ | 232.36 | 3310 | 55.44 | 1.97 | 0.47 | 1 | 1 | 25 |
| $CsNO_3$ | 194.91 | 1200 | 40 | 9.16 | 1.88 | 4 | 3 | 24 |

TABLE 1-continued

Selected Endothermic Compounds Useful For Cooling Surfaces, Solids and Liquids

| Solute | MW (gm/mol) | LD$_{50}$ (oral-rat; mg/kg) | Heat of Solution (kJ/mol) | Solubility (gm solute per 100 gm water at 20° C.) | Heat Absorbed (during dissolution of compound in 100 gm of water at 25° C. in kJ) | Theoretical Change in Temperature of a saturated solution (° C.) | Predicted Change in Temperature of a saturated solution exhibiting 30% heat loss (° C.) | Predicted Final Temperature of 255 gm of liquid exposed to saturated solution exhibiting 50% heat loss (° C.) |
|---|---|---|---|---|---|---|---|---|
| BaCl$_2$•2H$_2$O | 244.27 | 118 | 20.58 | 31 | 2.61 | 5 | 3 | 24 |
| MgSO4•7H2O | 246.36 | 2840 | 16.11 | 255 | 16.67 | 11 | 8 | 20 |

In Table 1, the selected endothermic compounds (solutes) are classified with respect to their toxicity, heat of solution and solubility in water. Toxicity is measured by the oral rat LD$_{50}$ value for a compound taken from various toxicological databases or from the Material Safety Data Sheet (MSDS) for the compound or from other indicators of toxicity if LD$_{50}$ data is not available. Compounds with an LD$_{50}$ above 1000 are preferred for applications where there is a potential for human and environmental exposure. Heat of solution values are taken from CRC Handbook of Chemistry and Physics, 90th Ed. Solubility values are taken from the Solubility Database shown on the International Union of Pure and Applied Chemistry/National Institute of Standards and Technology website.

The coolant can be any of the water-soluble endothermic salts listed in the table above or potentially others; however, an exemplary salt solution is ammonium nitrate (55%), ammonium phosphate 5% and pure water 40%. These compounds, and percentages, are purely exemplary and should not be considered limiting and various concentrations of the salt solution will be discussed in greater detail below.

The reservoir volumes and piping are sized to accommodate the desired cooling load. To separate pure water from a salt solution contained in the adjacent receptacle, a distillation membrane is utilized. The piping for transporting the pure water and the salt solution to the various system components that are detailed throughout this discussion is resistant to the corrosive effects of the salt solution and is sized to meet the flow rate and pressure demands of the specific application of the user. Stainless steel piping is contemplated by this disclosure because of the ability of stainless steel to resist the corrosive effects of the salt solutions, to withstand the elevated temperatures at which the salt solution is heated and the ability to conduct heat between the salt solution internal to the piping and the materials that contact the exterior surface of the piping. Other piping materials, such galvanized steel or engineered polymers are also contemplated by this disclosure.

Some critical points to keep in mind as the details of the system disclosed herein are revealed. First, and as shown in FIG. 1, the solubility of the endothermic salt increases with an increase in temperature for a highly soluble endothermic salt. Second, as shown in greater tabular detail in Table 2 below. Approximately 40 kg of water is required to dissolve the endothermic salt at −5° C. while only around 10 kg of water is required to dissolve the salt at 60° C. A 60° C. saturated salt solution contains 80% salt by weight while a −5° C. salt solution only contains 52% salt by weight.

TABLE 2

Temperature and Salt Solution Concentration

| TEMPERATURE - °C. | SOLUBILITY - GM/100 GM WATER | REQUIRED SOLUTE FOR 1 HR COOLING AT 2050 BTU/HR - GMS | REQUIRED SOLVENT - GMS | SATURATED SOLUTION WEIGHT - GMS | SOLUTE WT. % | SOLVENT WT. % |
|---|---|---|---|---|---|---|
| −5 | 110 | 44946 | 40860 | 85806 | 52 | 0.48 |
| 0 | 118 | 44946 | 38090 | 83036 | 54 | 0.46 |
| 5 | 126 | 44946 | 35671 | 80617 | 56 | 0.44 |
| 10 | 134 | 44946 | 33542 | 78488 | 57 | 0.43 |
| 15 | 142 | 44946 | 31652 | 76598 | 59 | 0.41 |
| 20 | 150 | 44946 | 29964 | 74910 | 60 | 0.40 |
| 25 | 187 | 44946 | 24035 | 68981 | 65 | 0.35 |
| 30 | 223 | 44946 | 20155 | 65101 | 69 | 0.31 |
| 35 | 260 | 44946 | 17287 | 62233 | 72 | 0.28 |
| 40 | 297 | 44946 | 15133 | 60079 | 75 | 0.25 |
| 45 | 325 | 44946 | 13830 | 58776 | 76 | 0.24 |
| 50 | 354 | 44946 | 12697 | 57643 | 78 | 0.22 |
| 55 | 382 | 44946 | 11766 | 56712 | 79 | 0.21 |
| 60 | 410 | 44946 | 10962 | 55908 | 80 | 0.20 |

Figure 2:
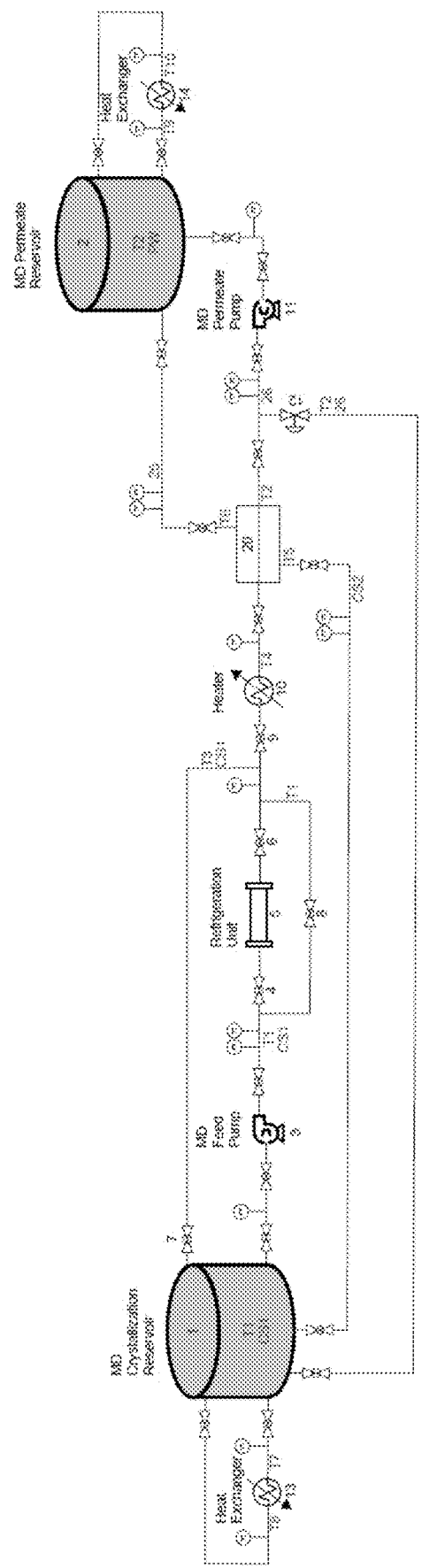
FIG. 2 illustrates an embodiment of the cooling system, with heat exchangers placed on the reservoirs.

As seen in FIG. 2, an embodiment of the cooling system 10 includes a coolant solution CS1 at temperature T1 within the membrane distillation ("MD") crystallization reservoir 1 and pure water 26 at temperature T2 within the MD permeate reservoir 2. To start the refrigeration phase of the cooling process, the coolant solution is pumped under moderate pressures, typically less than 20 psi, with the feed pump 3 to the refrigeration unit 5. Valves 4 and 6 are open to allow flow through the refrigeration unit 5, and valve 8, for bypassing the refrigeration unit, and valve 9, for flow to the distillation membrane, are closed. The refrigeration unit 5 transfers heat to the coolant solution CS1 such that the temperature T1 is increased to T3, typically around 50° C. The coolant solution CS1 continues to pump through the refrigeration unit 5 to the open valve 7, where it enters the MD crystallization reservoir 1 and completes the refrigeration process loop.

During the refrigeration phase, the pure water 26 in the MD permeate reservoir 2 will not be pumped to the membrane module 20, and the flow control valve 12 will be completely closed. This will not change until the dehydration phase starts. The refrigeration phase will continue to pump coolant solution CS1 through the refrigeration unit 5 and back to the MD crystallization reservoir 1 until the temperature T3 leaving the refrigeration unit is equal to the temperature T1 of the MD crystallization reservoir 1. Once this occurs, the dehydration phase will begin.

To start the dehydration phase, bypass valve 8 and valve 9 are opened. Valves 4 and 6 on either side of the refrigeration unit 5 are closed, as well as valve 7. Once the refrigeration unit 5 is bypassed, the coolant solution CS1 will no longer be absorbing heat from a heat source, and the temperature bypassing the refrigeration unit 5 will be equal to T1. After passing through the refrigeration unit 5, the coolant solution CS1 can be further heated using an additional heater 10 to raise the T1 temperature to a higher temperature T4. The T4 temperature is the feed temperature of the coolant solution CS1 passing across the distillation membrane.

The additional heater 10 will only be required for applications requiring higher flux, which is driven by a greater temperature difference across the distillation membrane and thus a higher T4. Typically, the heater 10 will operate as a heat exchanger like the one described previously, with a heat source of air or water passing over the piping containing the coolant solution CS1. The increase in temperature from T1 to T4 across the heater 10 will usually be around 10° C. to 40° C. Once the coolant solution CS1 has passed through the heater 10, it will enter the feed side of the membrane module 20.

As seen in FIG. 2, a pure water stream 26 passes through the permeate side of the membrane module 20. During the dehydration phase, pump 11 is switched on to pump flow to the membrane module 20. This pure water 26 originates from MD permeate reservoir 2 and is maintained at temperature T2 of around 20° C. Pump 11 is used to pump the pure water 26 from the MD permeate reservoir 2 at low pressure, typically less than 20 psi.

Figure 4:
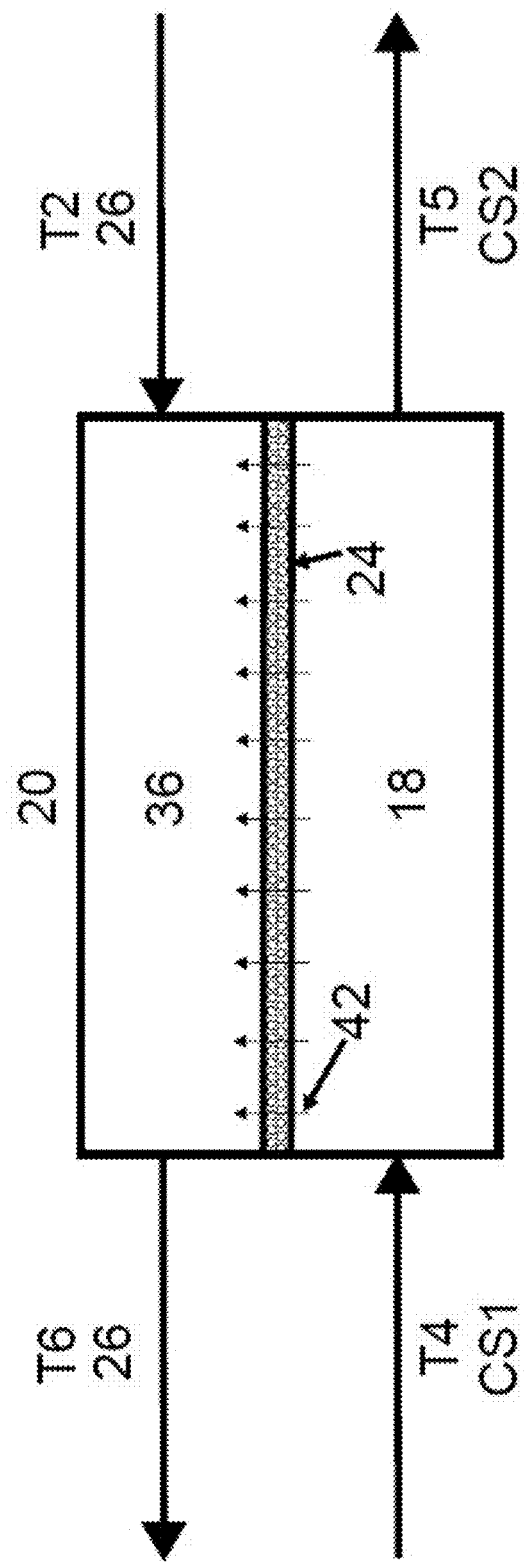
FIG. 4 illustrates the operation of the distillation membrane within a membrane module.

As seen in FIG. 4, the feed chamber 18 of the membrane module 20 containing the heated coolant solution CS1 is separated from the permeate chamber 36 that contains the pure water 26 by the hydrophobic distillation membrane 24. It is at the distillation membrane 24 that the temperature difference ($\Delta T=T4-T2$) between the coolant solution CS1 in the feed chamber 18 and the pure water 26 in the permeate chamber 36 provides the driving force to extract or permeate pure water 26 from the coolant solution CS1 in the form of water vapor 42 through the membrane 24 into the pure water stream 26 flowing through the permeate chamber 36. The higher temperature of the coolant solution CS1 compared to the temperature of the pure water 26 induces water vapor 42 to pass from the coolant solution CS1 through the distillation membrane 24 while restricting the transfer of liquid water 26, metallic and non-metallic cations and anions, non-volatile organic compounds and dissolved gases such as carbon dioxide through the membrane 24.

As the dehydration phase continues and water vapor 42 permeates from the coolant solution CS1 through the distillation membrane 24, the coolant solution CS1 becomes more concentrated and increases in density. The permeation process in the membrane module 20 increases the volume of pure water 26 in the permeate loop while pure water 26 is removed at an equal rate in the feed loop. The concentrated coolant solution CS2 exits the feed chamber 18 of the membrane module 20 at a temperature T5 of around 50° C., or roughly 30° C. warmer than the temperature T6 of the pure water 26 exiting the permeate chamber 36 of the membrane module 20.

This temperature differential $\Delta T$ between the coolant solution CS1 entering the membrane module 20 and the pure water 26 on the opposite side of the membrane 24 is critical for proper operation of the system. A 30° C. differential between the temperature of the coolant solution CS1 entering the feed chamber 18 of the membrane module 20 and the temperature of the pure water 26 in the permeate chamber 36 of the membrane module 20 significantly increases the flux of water vapor 42 across the membrane 24 as compared to when there is little temperature difference. The vapor pressure of the coolant solution CS1 increases with the temperature differential $\Delta T$ thereby increasing the driving forces across the distillation membrane surface 24. The increase in the temperature gradient $\Delta T$ across the distillation membrane 24 positively impacts the diffusion coefficient and leads to an increase in vapor flux.

As seen in FIG. 2, after the concentrated coolant solution CS2 leaves the membrane module 20 it travels back to the MD crystallization reservoir 1. Once the concentrated coolant solution CS2 enters the MD crystallization reservoir 1 it mixes with the coolant solution CS1, which causes the coolant solution CS1 to become more concentrated. Additionally, heat will also be transferred between the heated concentrated coolant solution CS2 leaving the membrane module 20 at T5 of around 50° C. and the coolant solution CS1 in the MD crystallization reservoir 1 at temperature T1 of around 20° C. as the concentrated coolant solution CS2 is added back to the MD crystallization reservoir 1.

A heat exchanger 13 is added to the MD crystallization reservoir 1 to facilitate the formation of salt crystals that will fall out of solution as the concentrated coolant solution CS2 cools. Heat exchanger 13 will operate throughout the entire dehydration phase, but not during the refrigeration phase. Crystal formation is a key step in regenerating the coolant solution so that the cooling process can continue. A heat exchanger 14 is also added to the MD permeate reservoir 2 to account for an increase in temperature T6 of the pure water stream 26 that is added back to the MD permeate reservoir 2.

Figure 3:
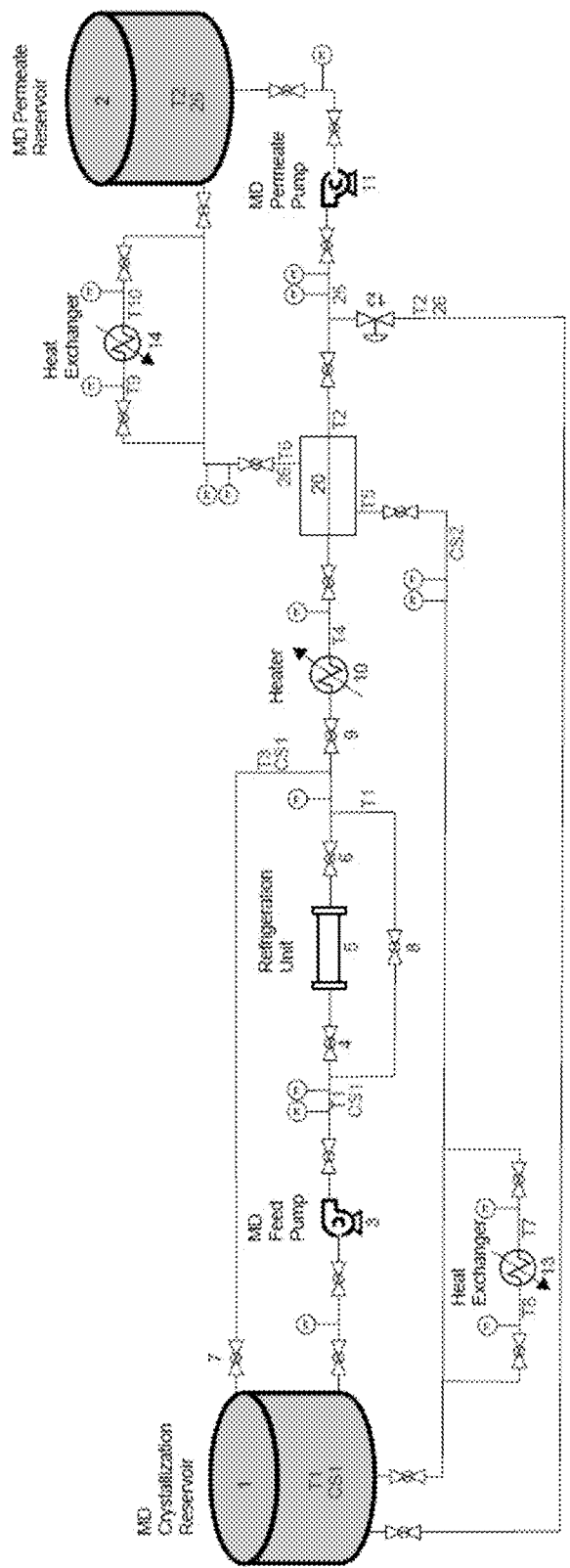
FIG. 3 illustrates an embodiment of the cooling system, with heat exchangers placed in-line the coolant and pure water streams.

The heat exchangers 13 and 14 are necessary for proper cooling system operation during the dehydration phase. However, heat exchangers 13 and 14 can be placed in multiple locations. FIG. 2 shows the heat exchangers 13 and 14 placed directly on the MD crystallization reservoir 1 and the MD permeate reservoir 2. FIG. 3 shows an optional method of placing the heat exchangers in-line the return streams to the MD crystallization reservoir 1 and the MD permeate reservoir 2. These streams correspond to the concentrated coolant solution CS2 stream at T5 returning to the MD crystallization reservoir 1 and the pure water 26 stream at T6 returning to the MD permeate reservoir 2.

Either placement of the heat exchangers 13 and 14 can be utilized depending on the application required and any size or volume constraints placed on the operation. Heat exchanger 13 facilitates crystal formation for the concentrated coolant solution CS2 within the membrane crystallization reservoir 1. Heat exchanger 14 simply keeps the temperature T2 of the MD permeate reservoir 2 constant.

The functions of both the heat exchangers 13 and 14 can be performed by removing heat on the reservoirs themselves or on the return streams.

The dehydration phase will continue until the required crystal formation has occurred to regenerate the cooling process. The final step in the dehydration phase is the addition of pure water 26 to the MD crystallization reservoir 1 containing the newly formed crystals that precipitated out of the concentrated coolant solution CS2. The amount of water sent to the MD crystallization reservoir 1 is controlled using a flow control valve 12. This flow control valve 12 will be opened at a certain percentage, % open, depending on the amount of pure water 26 required to send to the MD crystallization reservoir 1. This amount, the water of hydration, is equal to the flux, the rate of pure water 26 that evaporates across the distillation membrane.

The flux will vary depending on the application of the cooling system process, as well as during any individual application itself due to fouling and scaling of the membrane as discussed previously. Once the water of hydration is pumped from the MD permeate reservoir 2 with the permeate pump 11 through the flow control valve 12 and into the MD crystallization reservoir 1, the dehydration phase is complete and the refrigeration phase of the cooling process will start again. The refrigeration phase and dehydration phase will continue in succession if the cooling process is operating.

In one embodiment of the invention, coolant solution comprising 55% ammonium nitrate, 5% ammonium phosphate, and 40% water having a density of 1.27 kg/L was transferred at a flow rate of 0.75 liter per minute from the MD crystallization reservoir to the refrigeration unit where the temperature of the coolant solution was raised to 50° C. The heated coolant was then transferred to the membrane module which contained a 0.1 square meter of Microdyn hollow fiber membrane. The membrane module used was sized for a bench-scale operation, as opposed for a commercial operation. In a commercial operation, the membrane module would have sufficient membrane area to remove the desired amount of water from the feed stream in a single pass. Therefore, multiple cycles through the membrane module over an extended period were required to achieve the desired removal of water from the coolant solution using the bench scale membrane module.

A permeate stream of pure water at 20° C. was pumped at a flow rate of 0.7 liters per minute through the module. After 13 hours of operation, the flux declined from 7.5 LMH to 1 LMH as crystals formed within the feed stream coolant solution. Around 40% of the pure water was removed, increasing the total dissolved salts in the coolant solution from 50% to 80%. The feed stream coolant solution containing the crystallate slurry was transferred back through a heat exchanger into the MD crystallization reservoir where the water of hydration was added from the MD permeate reservoir. The temperature of the rehydrated coolant solution in the crystallization reservoir decreased in temperature by around 12° C. as the crystals in the slurry re-dissolved.

Having shown and described various embodiments of the disclosed system, further adaptations of the system described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings. Moreover, the order of the components detailed in the system may be modified without limiting the scope of the disclosure.

We claim:

1. A system for cooling an object or a space; the system comprising:
   a refrigeration process loop, a dehydration process loop and a distillation membrane module with a feed chamber and a permeate chamber;
   the refrigeration process loop comprising:
   (i) a first reservoir containing a quantity of a water soluble endothermic salt solution, the first reservoir salt solution at a temperature T1;
   (ii) a first piping system;
   (iii) a cooling unit for absorbing heat from at least one of an object or a space, and transferring the heat to the salt solution thereby increasing the temperature of the salt solution to T3;
   (iv) a temperature monitoring system for measuring and comparing the temperature of the salt solution in the first reservoir and the salt solution passing through the cooling unit in the first piping system;
   (v) a plurality of first piping system valves operable to control flow of the salt solution within the first piping system;
   (vi) a pump for pumping the salt solution within the first piping system between at least one of the cooling unit and the distillation membrane module, wherein the salt solution initially is pumped through the cooling unit and recirculates to the first reservoir until the first reservoir salt solution temperature T1 equilibrates with the temperature T3 of the salt solution in the cooling unit at which time the system for cooling activates the dehydration process loop and the first piping system valves restrict flow to the cooling unit with salt solution at temperature T4 being pumped instead to the feed chamber of the distillation membrane;
   the dehydration process loop comprising:
   (i) a second reservoir containing a quantity of water, the quantity of water at a temperature T2;
   (ii) a second piping system;
   (iii) a plurality of valves operable to control the flow of water within the second piping system;
   (iv) a pump for pumping the water within the second piping system, the second piping system valves directing water at temperature T2 to the permeate chamber of the distillation membrane; wherein
   the temperature differential ($\Delta T=T4-T2$) of the two fluids in the opposing chambers of the distillation membrane facilitates extraction of permeate water from the salt solution into the second piping system causing the weight percent of salt in a concentrated salt solution following passage through the distillation membrane to increase beyond the point of saturation thereby inducing crystallization in the salt solution returning to the first reservoir via the first piping system, the rehydration of the saturated salt solution in the first reservoir due to the presence of a salt solution at a lesser salt concentration than the concentrated salt solution resulting in an endothermic reaction that lowers the temperature of the salt solution in the first reservoir thereby causing the temperature monitoring system to re-initiate the refrigeration process loop and pump the salt solution from the first reservoir through the first piping system into the cooling unit to achieve the desired cooling of the object or space.

2. The system for cooling an object or a space of claim 1, wherein a heat input device raises the temperature T4 of the rerouted salt solution.

3. The system for cooling an object or a space of claim 2, wherein waste heat is a heat input device.

4. The system for cooling an object or a space of claim 1, wherein the time of contact by the salt solution and the water in the distillation membrane is optimized to achieve a roughly fifty percent removal of the water of hydration.

5. The system for cooling an object or a space of claim 1, wherein the flow of the water in the permeate side of the distillation membrane is counter to the flow of the salt solution in the feed side of the distillation membrane.

6. The system of claim 1, wherein the temperature T4 is in the range of about 35° to 65° C.

7. The system of claim 1, wherein the temperature T2 is in the range of about 20° to 35° C.

8. The system of claim 1, wherein the temperature T1 is in the range of about −5 C° to 15° C.

9. The system of claim 1, wherein the coolant and concentrated coolant are a water-soluble endothermic salt.

10. The system of claim 5, wherein the coolant is comprised of about 55% ammonium nitrate, about 5% ammonium phosphate and about 40% pure water.

11. The system of claim 1, wherein the pure water is distilled water.

12. The system of claim 1, wherein the distillation membrane is fabricated from a hydrophobic membrane.

13. The system of claim 1, wherein the distillation membrane is fabricated from at least one of polytetrafluoroethylene (PTFE), polypropylene (PP), polyethylene (PE) and polyvinylidene fluoride (PVDF) covalent organic framework membranes (COF), metal organic framework membranes (MOF), porphryn polymerized membranes (PPM), graphene oxide and graphene.

14. The system of claim 1, wherein the coolant in the coolant receptacle is at least 10° C. warmer than the pure water in the pure water receptacle.

15. The system of claim 1, wherein the first pump provides pressure in the coolant piping system to circulate the volumes of coolant, concentrated coolant and coolant mixed with concentrated coolant.

16. The system of claim 1, wherein the second pump provides pressure in the pure water piping system to circulate the volume of pure water.

17. The system of claim 1, wherein the flow rate from the flow control valve is variably adjustable.

18. A method for extracting heat from an object or a space; the method comprising:
configuring an interoperable refrigeration process loop, a dehydration process loop and a distillation membrane module with a feed chamber and a permeate chamber;
the refrigeration process loop comprising:
(i) a first reservoir containing a quantity of a water soluble endothermic salt solution, the first reservoir salt solution at a temperature T1;
(ii) a first piping system for movement of the endothermic salt solution;
(iii) a cooling unit for absorbing heat from at least one of an object or a space, and transferring the heat to the salt solution thereby increasing the temperature of the salt solution to T3;
(iv) a temperature monitoring system for measuring and comparing the temperature of the salt solution in the first reservoir and the salt solution passing through the cooling unit in the first piping system;
(v) a plurality of first piping system valves operable to control flow of the salt solution within the first piping system;
(vi) a pump for pumping the salt solution within the first piping system between at least one of the cooling unit and the distillation membrane module, wherein the salt solution initially is pumped through the cooling unit and recirculates to the first reservoir until the first reservoir salt solution temperature T1 equilibrates with the temperature T3 of the salt solution in the cooling unit at which time the system for cooling activates the dehydration process loop and the first piping system valves restrict flow to the cooling unit with salt solution at temperature T4 being pumped instead to the feed chamber of the distillation membrane;
the dehydration process loop comprising:
(i) a second reservoir containing a quantity of water, the quantity of water at a temperature T2;
(ii) a second piping system for movement of the water;
(iii) a plurality of valves operable to control the flow of water within the second piping system;
(iv) a pump for pumping the water within the second piping system, the second piping system valves directing water at temperature T2 to the permeate chamber of the distillation membrane; wherein
opposing chambers of the distillation membrane facilitate extraction of the permeate water from the salt solution due to the temperature differential ($\Delta T=T4-T2$) of the two fluids;
drawing permeate water from the distillation membrane into the second piping system causing the weight percent of salt in a concentrated salt solution to increase beyond the point of saturation; thereby
inducing crystallization in the salt solution returning to the first reservoir via the first piping system,
rehydrating the saturated salt solution in the first reservoir due to the presence of a salt solution at a lesser salt concentration than the concentrated salt solution resulting in an endothermic reaction that lowers the temperature of the salt solution in the first reservoir thereby causing the temperature monitoring system to re-initiate the refrigeration process loop;
and pumping the salt solution from the first reservoir through the first piping system into the cooling unit to achieve the desired cooling of the object or space.

* * * * *